US012636815B2

(12) United States Patent
Mantenuto

(10) Patent No.: US 12,636,815 B2
(45) Date of Patent: *May 26, 2026

(54) STONE SLAB TRANSFER AND PROCESSING SYSTEM AND METHODS

(71) Applicant: ONETOUCH CNC Inc., Etobicoke (CA)

(72) Inventor: Paolo Mantenuto, Vaughan (CA)

(73) Assignee: ONETOUCH CNC Inc., Etobicoke (CA)

( * ) Notice: Subject to any disclaimer, the term of this patent is extended or adjusted under 35 U.S.C. 154(b) by 889 days.

This patent is subject to a terminal disclaimer.

(21) Appl. No.: 17/791,018

(22) PCT Filed: Feb. 24, 2020

(86) PCT No.: PCT/CA2020/050229
§ 371 (c)(1),
(2) Date: Jul. 6, 2022

(87) PCT Pub. No.: WO2021/168528
PCT Pub. Date: Sep. 2, 2021

(65) Prior Publication Data
US 2023/0019907 A1 Jan. 19, 2023

(51) Int. Cl.
B28D 7/04 (2006.01)
B28D 1/04 (2006.01)
*B23D 45/02* (2006.01)
*B23D 47/04* (2006.01)

(52) U.S. Cl.
CPC .............. B28D 7/043 (2013.01); B28D 1/043 (2013.01); *B23D 45/027* (2013.01); *B23D 47/04* (2013.01)

(58) Field of Classification Search
CPC .......... B28D 7/04; B28D 7/043; B28D 7/046; B28D 1/043; B65G 47/915; B65G 47/962; B65G 47/965; B65G 49/067; B24B 41/068; B23Q 1/50–525; B23Q 1/66; B23Q 1/68; B23Q 1/74
USPC ....... 125/35; 451/388, 405; 269/21, 71, 296; 414/758; 83/119
See application file for complete search history.

(56) References Cited

U.S. PATENT DOCUMENTS

| | | | | | |
|---|---|---|---|---|---|
| 3,881,618 | A | * | 5/1975 | Tausheck | B65G 49/067 |
| | | | | | 414/494 |
| 6,152,127 | A | * | 11/2000 | Fuhrman | B28D 1/047 |
| | | | | | 125/35 |
| 7,472,636 | B2 | * | 1/2009 | Bavelloni | B65G 49/068 |
| | | | | | 83/13 |

(Continued)

FOREIGN PATENT DOCUMENTS

| | | |
|---|---|---|
| CN | 103753713 A | 4/2014 |
| CN | 205997180 U | 8/2017 |
| CN | 207359371 U | 5/2018 |

(Continued)

*Primary Examiner* — Brian D Keller
*Assistant Examiner* — Marcel T Dion
(74) *Attorney, Agent, or Firm* — DLA Piper LLP (US)

(57) ABSTRACT

A dual platform bed system has an associated machine for transferring material sheets from one platform bed to another. There are associated methods for both transferring and processing sheets on either or both platforms. Placing the platform beds adjacent one another reduces both human worker requirement and human and machine down time.

6 Claims, 16 Drawing Sheets

(56) References Cited

U.S. PATENT DOCUMENTS

| | | | | |
|---|---|---|---|---|
| 10,392,214 B2 * | 8/2019 | Gallucci | ................ | B65H 15/00 |
| 2016/0207223 A1 * | 7/2016 | Schlough | ................. | B28D 7/02 |

FOREIGN PATENT DOCUMENTS

| | | | | |
|---|---|---|---|---|
| EP | 1219398 A2 * | 7/2002 | ........... | B23D 47/042 |
| EP | 2253422 A1 | 11/2010 | | |
| EP | 3412421 A1 * | 12/2018 | ............. | B28D 1/043 |

* cited by examiner

STONE SLAB TRANSFER AND PROCESSING SYSTEM AND METHODS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a system and methods for transporting and processing material sheets between work stations in a manner reducing human worker input as well as worker and machine downtime, and more particularly in the field of transporting and processing stone slabs.

2. Description of Related Art Including Information Disclosed Under 37 CFR 1.97 and 37 CFR 1.98

This application discloses numerous benefits over the prior art particularly in the field of cutting and processing large heavy stone slabs, but even generally in the area of cutting, processing, and moving large material sheets from one station to another.

To properly explain the numerous advantages of the present invention it is necessary to understand issues and defects in the prior art relating particularly to commercial/industrial stone slab preparation.

When large stone slabs are received for processing, the slabs are roughly rectangular prisms wherein one face (meaning the prism side with the largest flat surface area) is finished.

The term "finished" can refer to a number of conditions including that the face has been planed flat and smoothed, the face has been planed flat and textured, or some other form of preparation.

A "finished slab" generally means that a slab face is considered essentially "flat" and level.

The opposing slab face (ie the unfinished face) however is not generally flat and tends to be topographically uneven.

These stone slabs are typically destined to become counter tops in residential and commercial establishments.

As such, it is known that only one face of the slab will ultimately be visible to a consumer, namely the flat or finished face.

When laying a counter top, producers do not worry about the unfinished face as it is hidden from the consumer, and as such the unfinished face can tolerate an uneven and even "damaged" appearance as long as the damage is not visible when the counter top is laid in place.

When laying a counter top, it is also known that the counter top must sit level-no consumer would tolerate an unstable, wobbly, tilted, or non-level counter top.

In stone factory production, there is also a necessity to be able to plane away a portion of the unfinished face around the slab perimeter thereby providing a uniform thickness around the entire slab for the purpose of laying a level counter.

Counter tops typically sit atop wooden or steel frames that define a perimeter wherein counter tops can be "inserted". When inserted, the counter top must sit flat and level, and that can occur only if the (otherwise topographically uneven) bottom face shows a perimeter that is flat, level, and uniform.

A uniform perimeter thickness ensures a counter top sits level and is stable.

To plane the slab perimeter, a computer numerical control (CNC) or human operated machine is used with a router attachment.

In order to properly plane the slab, the router must have a flat base of reference, and so it is desirable for producers to orientate the slab finished face downward for routering a uniformly thick perimeter.

By orientating the slab finished face down, the CNC machine has a consistent and flat base of reference, and knows exactly where to align the router in order to ensure the planing is even and does not damage the finished face.

This does not mean that the unfinished face is completely planed—it means only that a perimeter (or defined edge) around the slab is planed such that a portion of the unfinished face presents a uniform and consistent border thickness around the slab.

If the CNC machine router does not have a proper and flat base of reference, the router will not be able to properly measure a starting location let alone a routering path, and inevitably an incorrect reference plane will lead to an unusable and wasted slab/counter top.

By contrast, when initially cutting a stone slab (for the purpose of marking out a counter top shape or shapes), producers prefer to work with the stone finished face up.

This is because when cutting into stone (whether by microchisel, diamond blade, water jet, or any other implement) the stone surface initially being cut into compresses whereas the surface where the blade or chisel or jet exits (ie the surface where the cut is completed) expands, and this typically causes a "blow out" in the stone.

A blow out on the finished face of the stone would not be acceptable since that face would be visible to consumers.

However, a blow out on the unfinished face is acceptable because that face will never be visible to consumers.

For this reason, producers desire to work with the stone slab finished side facing upward when cutting slabs to make counter tops.

These stones are extremely large, heavy, and sharp, yet they are also fragile (when dropped, jarred, compressed, expanded, or sheared).

Moving stones from one work station to another is complicated and dangerous.

Moving stones becomes even more complicated and dangerous when trying to move the stone such that at one station the stone is finished side up and then at another station the stone is finished side down.

These stones are of sufficient size and weight to easily crush and kill human beings during transport, and the edges (when cut) are sharp enough to easily slice through human flesh.

Other difficulties in modern stone processing include the large amount of human labour required to set the slabs, move the slabs, and properly orientate the slabs from one work station to another to ensure proper cutting or processing.

Yet another issue is the time wasted in human labour eg correcting errors in placing and properly aligning a slab upon moving from one station to another.

There is also significant human worker down-time (meaning a human worker is sitting idle) because workers have to wait for a machine to finish working with a slab at one station before preparing the slab (or portions thereof) for moving to another station.

In the prior art, these cutting and processing stations are separate, consume a large amount of physical real estate, and are slow and cost-ineffective.

The prior art is also fraught with human worker danger because of the requirements in loading and transporting large heavy stones.

Typically, these large stones are moved using cranes, chains, and carts.

The prior art methods of moving large stone slabs has not changed appreciably in the last one hundred years.

Moving large and heavy stones in the prior art manner exposes human workers to constant and very real danger, including being crushed alive.

Stone slab edges are known to be extremely sharp, and workers can be exposed to deadly cuts when moving stones.

BRIEF SUMMARY OF THE INVENTION

The present invention includes a dual platform bed system with associated machine for transferring material sheets from one platform bed to another, and associated methods for both transferring and processing sheets on either or both platforms. Placing the platform beds adjacent one another reduces both human worker requirement and human and machine down time.

DETAILED DESCRIPTION OF THE INVENTION

Figure 1:
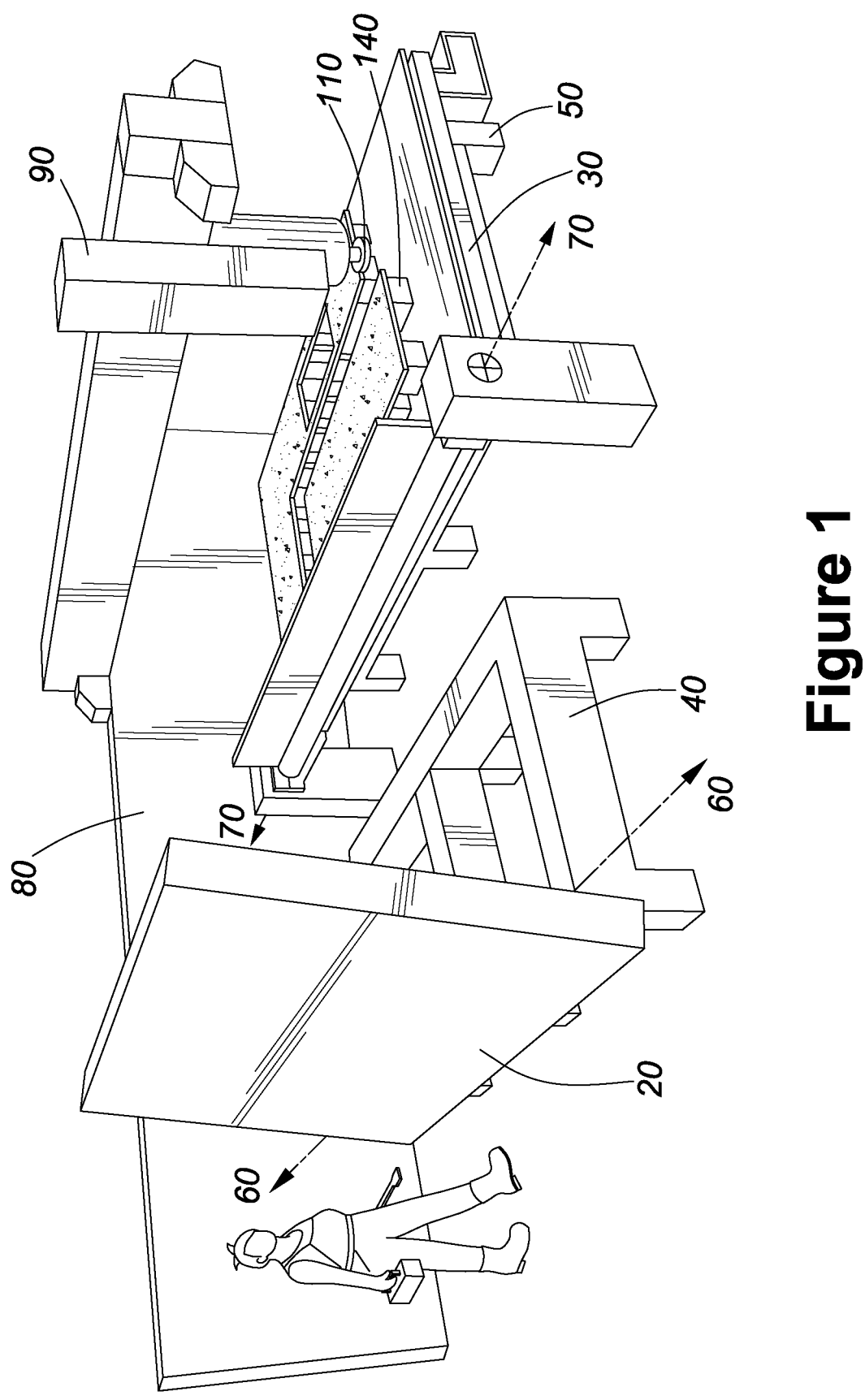
FIG. 1 is a perspective view showing a dual platform bed system with associated CNC machine with the first platform empty and the second platform processing a stone slab perimeter.

The present invention can be worked in relation to preparing a single stone slab (10) or multiple stone slabs (10) processed sequentially with one subsequent to another.

More generally, the present invention can be worked in relation to preparing sheets based on a variety of materials, be it wood, concrete, stone, glass, or even food-based product.

The present description equates slabs with sheets but acknowledges there are extra and special considerations for dealing particularly with stone slabs (10).

The present invention provides a system and methods for processing at least one sheet (or slab (10) as the case may be) at one station and then efficiently transporting (at least a portion of) that sheet to a second station for further processing.

The present invention can run continuously to process multiple sheets or slabs (10) because of the way the system is designed, how the system is laid out, and the methods employed in using the system.

With respect to apparatus, the system lifts, transports, and processes multiple sheets of any particular material.

The system is comprised of a pair of associated platforms (20, 30) each housed on corresponding frame beds (40, 50), each platform (20, 30) and corresponding frame bed (40, 50) being stationed beside and in proximity to the other platform (20, 30) and corresponding frame bed (40, 50).

Each platform (20, 30) is pivotable and moveable about a corresponding longitudinal axis (60, 70) along the corresponding associated frame bed (40, 50).

The second platform (30) and frame bed (50) are stationed next to the first platform (20) and frame bed (40).

The second platform (30) is pivotable and moveable, and ranges in motion starting from a) contacting and covering the second frame bed (50) to b) aligning over and covering the first platform (20) and back to a) contacting and covering the second frame bed (50).

Figure 8:
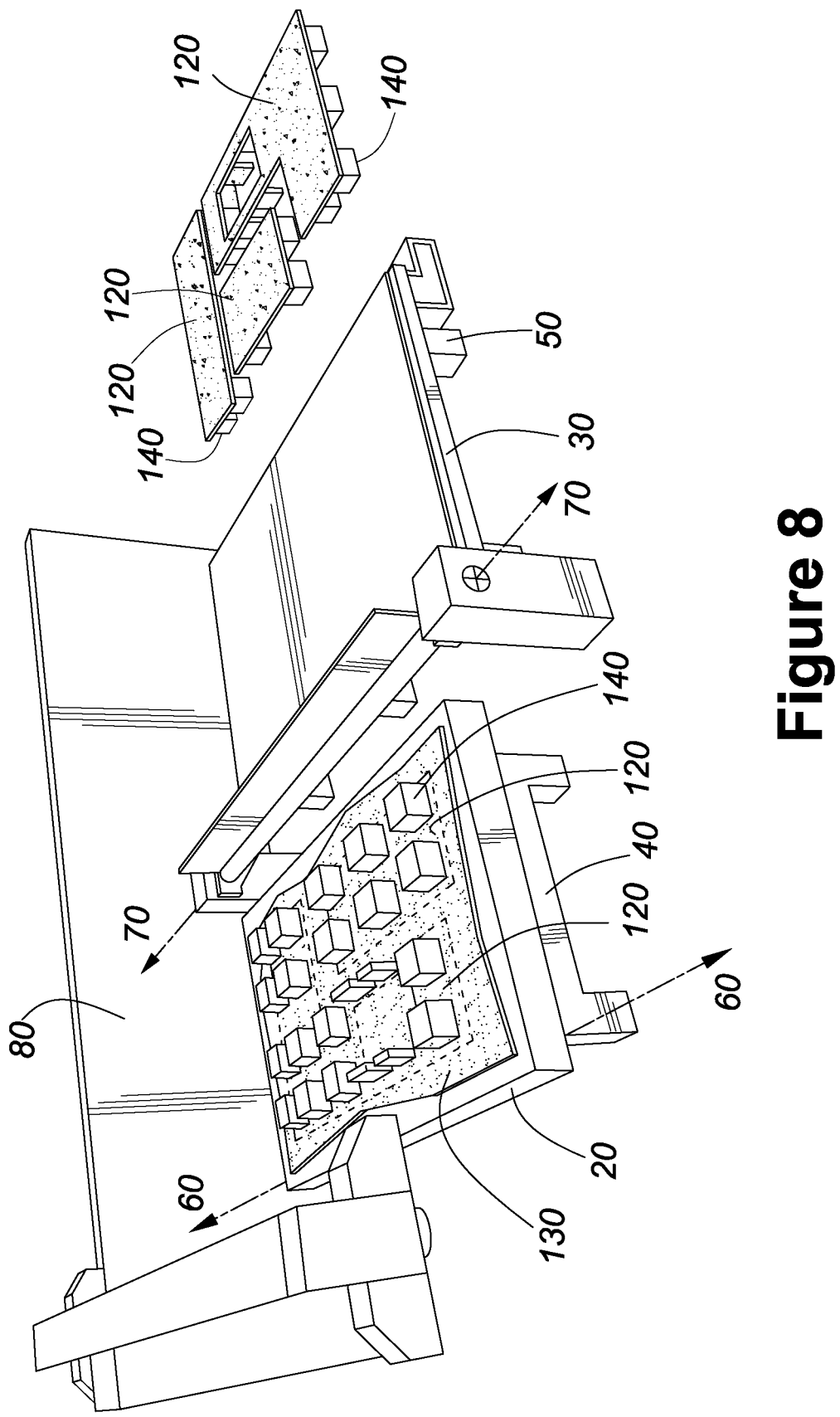
FIG. 8 is a perspective view showing a dual platform bed system with associated CNC machine with dual end pneumatic vacuum clamps placed on the cut stone slab pieces on the first platform and the second platform empty and idle.
Figure 9:
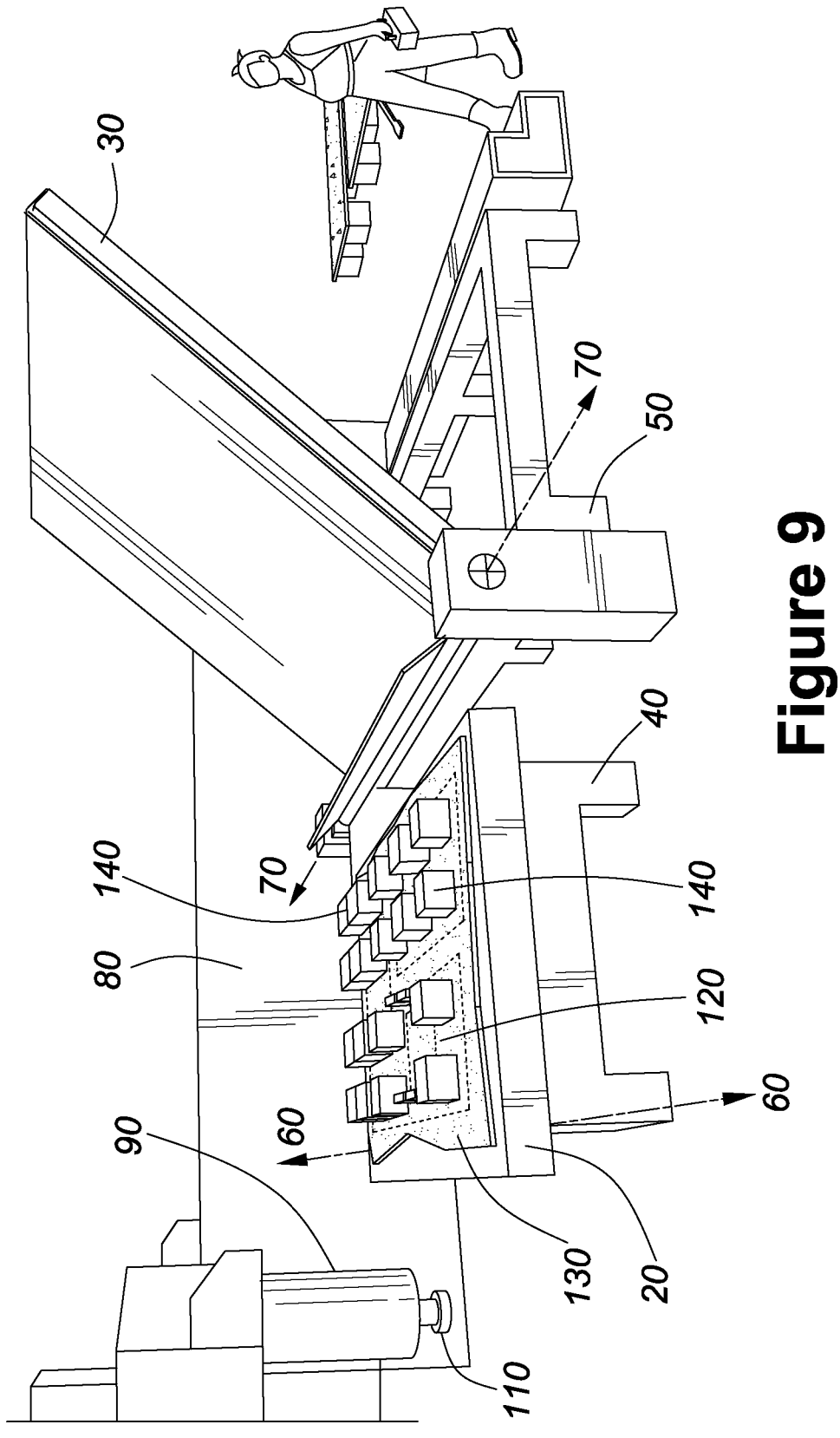
FIG. 9 is a perspective view showing a dual platform bed system with associated CNC machine with dual end pneumatic vacuum clamps placed on the cut stone slab pieces on the first platform and the second platform moving toward the first platform.
Figure 10:
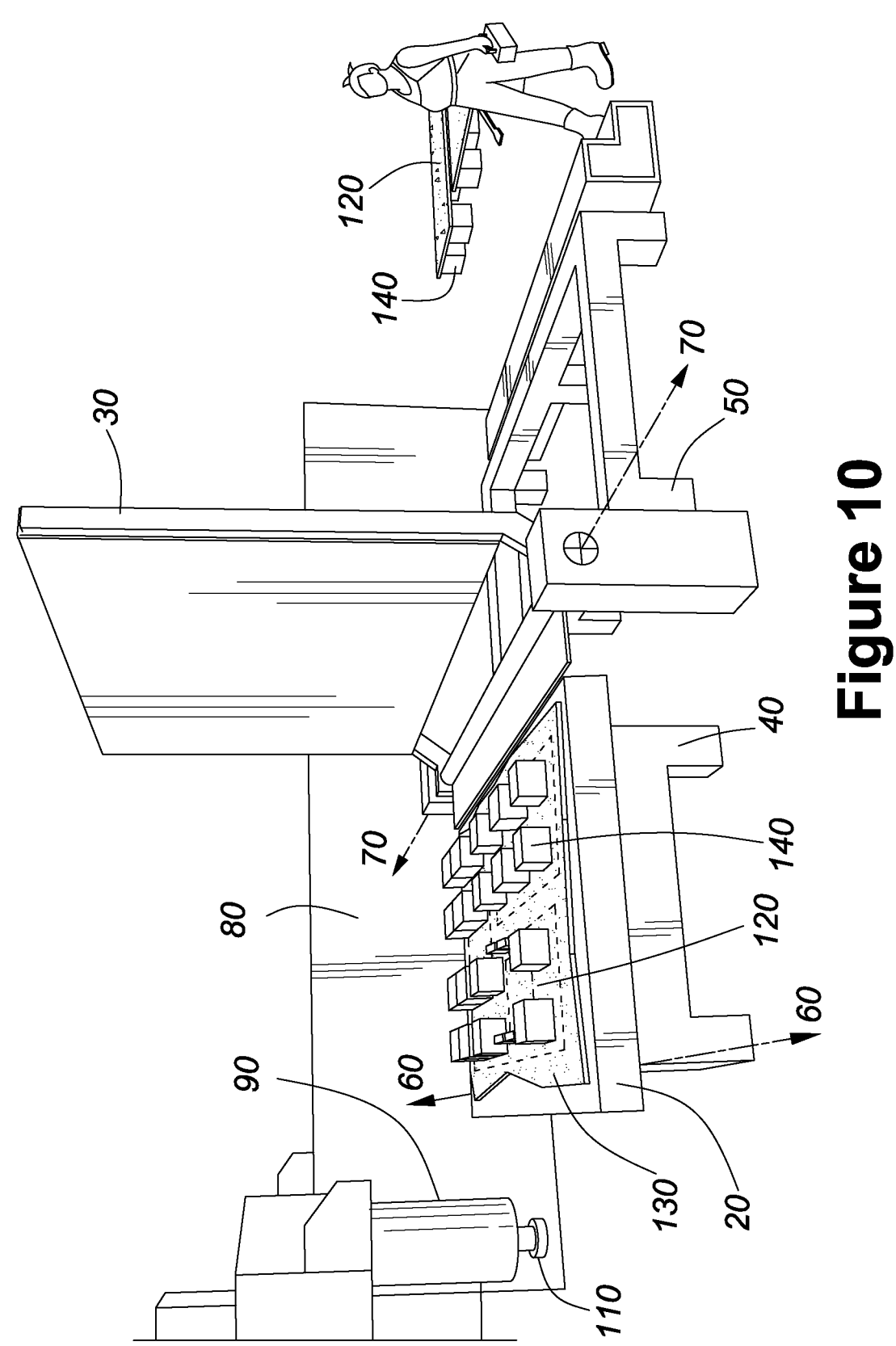
FIG. 10 is a perspective view showing a dual platform bed system with associated CNC machine with dual end pneumatic vacuum clamps placed on the cut stone slab pieces on the first platform and the second platform moving toward the first platform.
Figure 11:
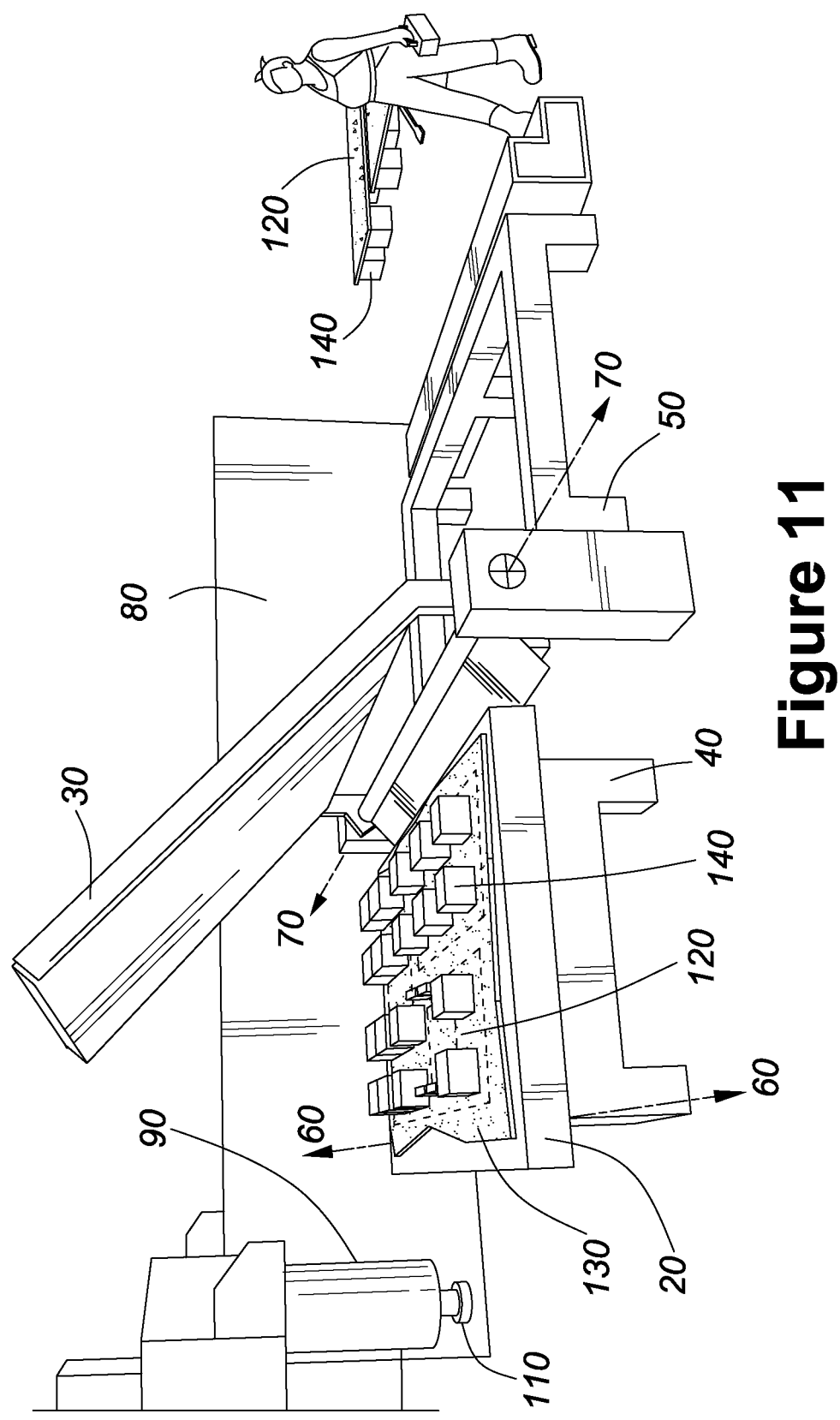
FIG. 11 is a perspective view showing a dual platform bed system with associated CNC machine with dual end pneumatic vacuum clamps placed on the cut stone slab pieces on the first platform and the second platform moving toward the first platform.
Figure 12:
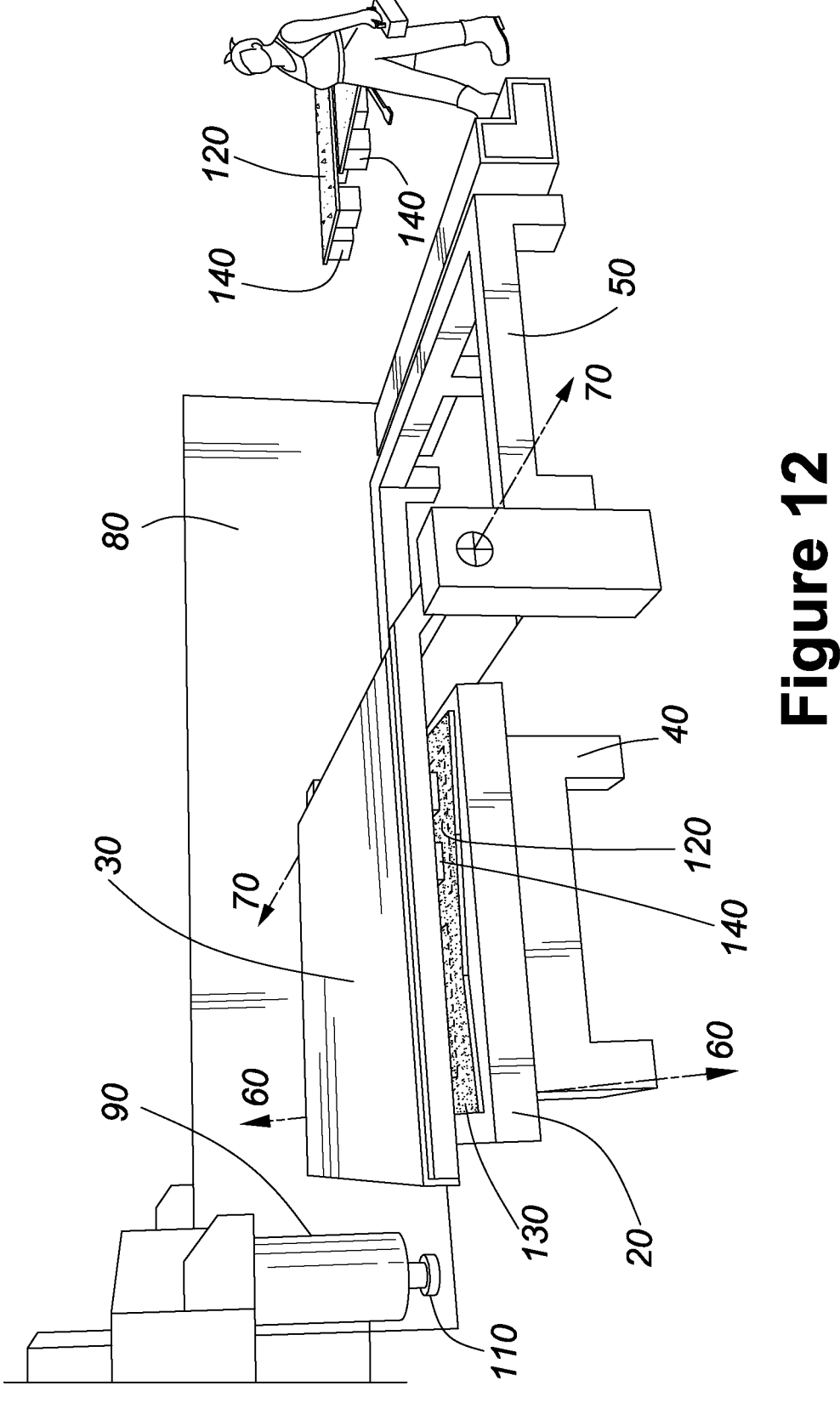
FIG. 12 is a perspective view showing a dual platform bed system with associated CNC machine with dual end pneumatic vacuum clamps placed on the cut stone slab pieces on the first platform and the second platform contacting the clamps on the first platform.
Figure 15:
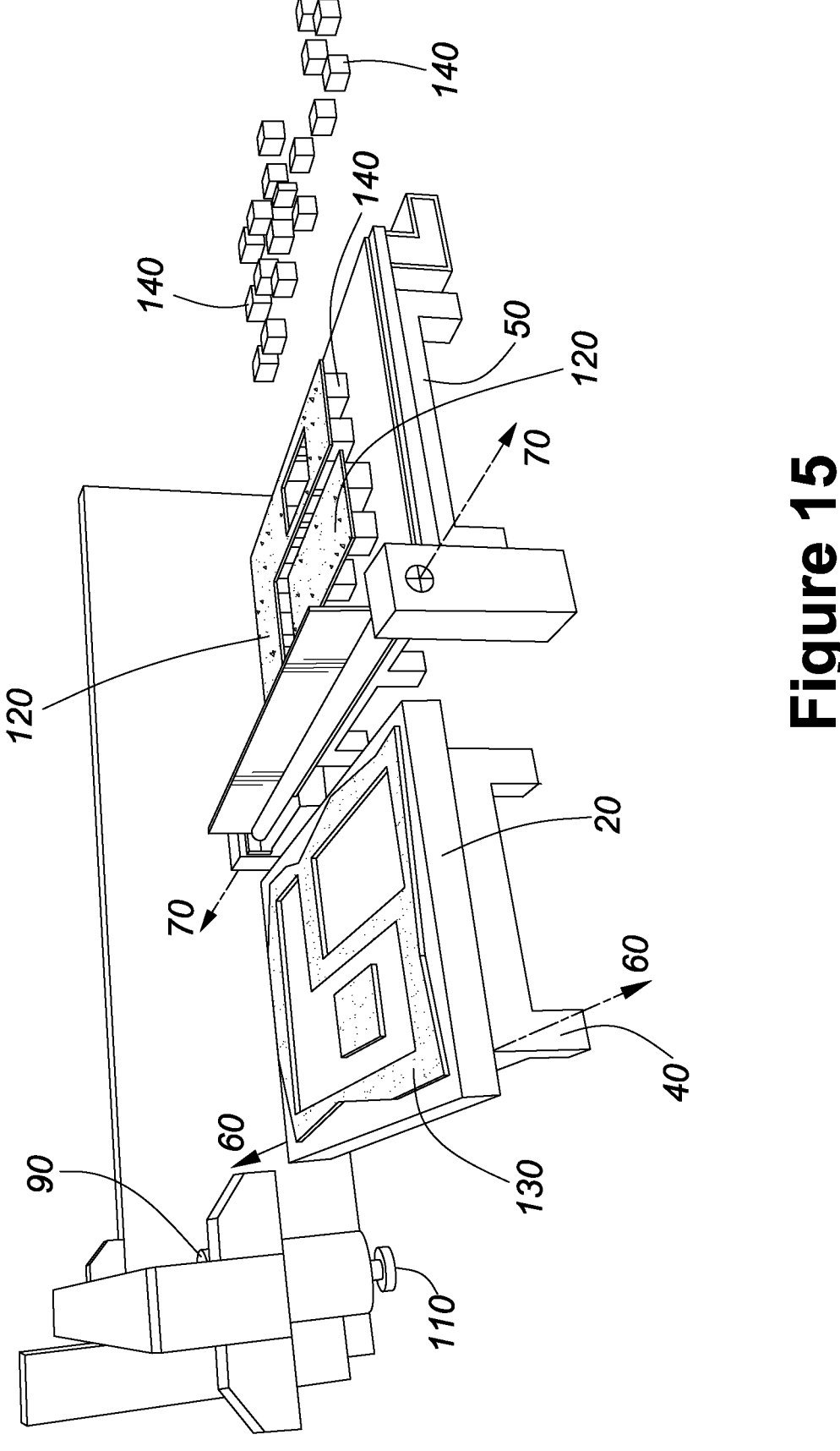
FIG. 15 is a perspective view showing a dual platform bed system with associated CNC machine with the second platform connected to dual end pneumatic vacuum clamps and cut stone slab pieces moving away from and leaving excess stone slab remains on the first platform.

The second platform (30) range of motion is best shown sequentially in FIG. 8 through to FIG. 15.

The first platform (20) and frame bed (40) is stationed next to the second platform (30) and frame bed (50).

The first platform (20) is pivotable and moveable, and ranges in motion from a) contacting and covering the first frame bed (40) to b) away from both the first platform frame bed (40) and away from the second platform (30) and then back to a) contacting and covering the first frame bed (40).

Figure 2:
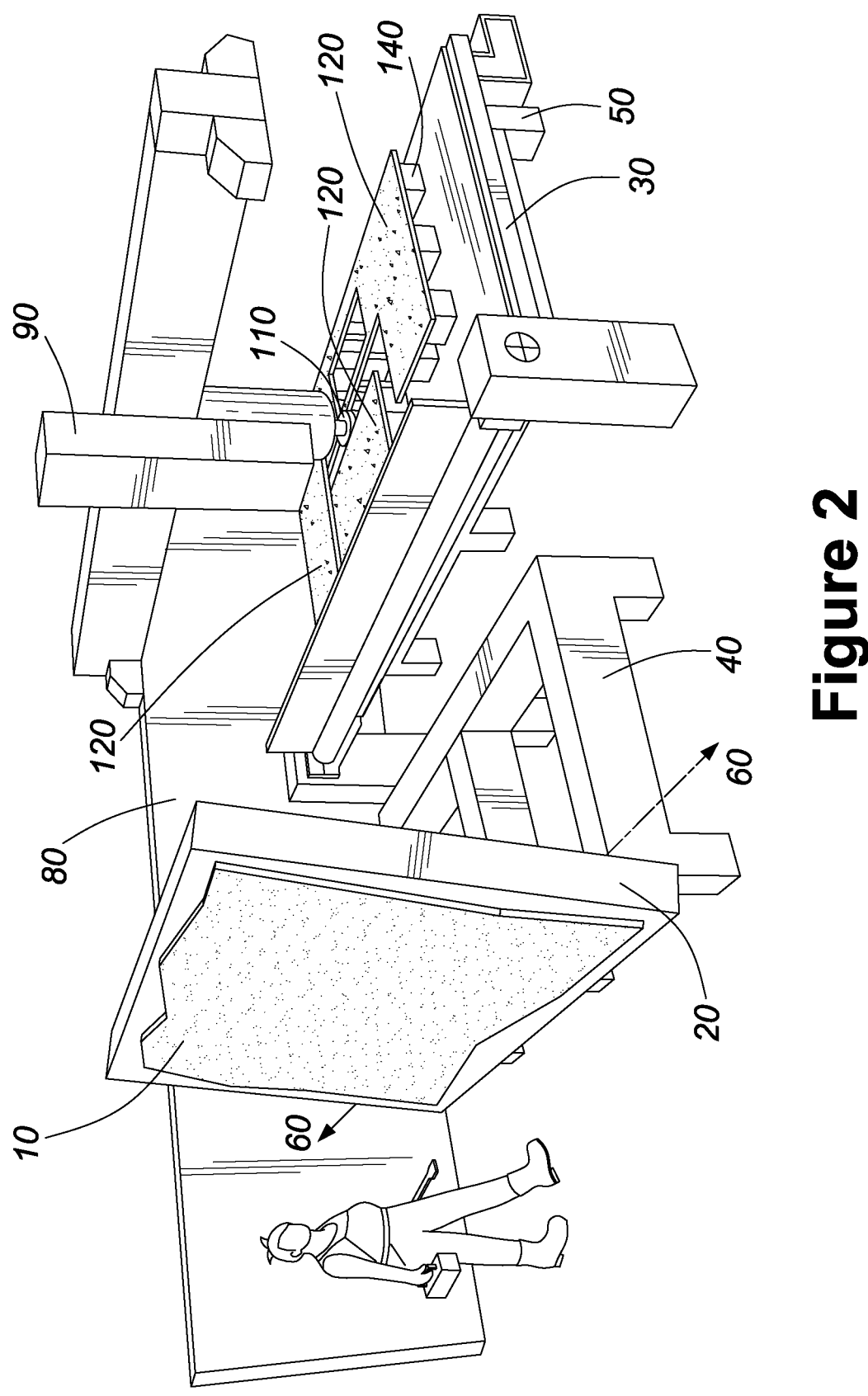
FIG. 2 is a perspective view showing a dual platform bed system with associated CNC machine with a stone slab being loaded on the first platform and the second platform processing a stone slab perimeter.

The first platform (20) is moveable and pivotable in range such that the platform (20) can lie horizontal and level, or can be positioned at an angle suitable for loading a stone slab (10) (such as shown in FIG. 2).

A mean (not shown) is associated with each platform (20, 30) to pivotably move said platforms (20, 30) through each corresponding range of motion.

Numerous prior art known means are readily known and publicly available, in respect of moving the platforms (20, 30) including long-known computerized hydraulic and pneumatic machinery as well as human labour.

These known hydraulic and pneumatic means are typically part of or otherwise easily integrate into machinery (80).

Machinery (80) (like CNC) is ubiquitous in numerous industries requiring commercial or industrial scale cutting, lifting, milling, grinding, routing, moving, processing and the like.

Typical industrial machinery (80) can be programmed with tasks such as moving platforms (20, 30), moving tool arms (90), operating tool arms (90) in a particular fashion, and executing complicated computer programs as required.

Machinery (80) tool arms (90) can be adapted with known operable tools such as blade saws (100), routers (110), grinders (not shown), welders (not shown), torches (not shown), and buffers (not shown).

The aforementioned tools are easily interchangeable by known means and techniques.

Figure 4:
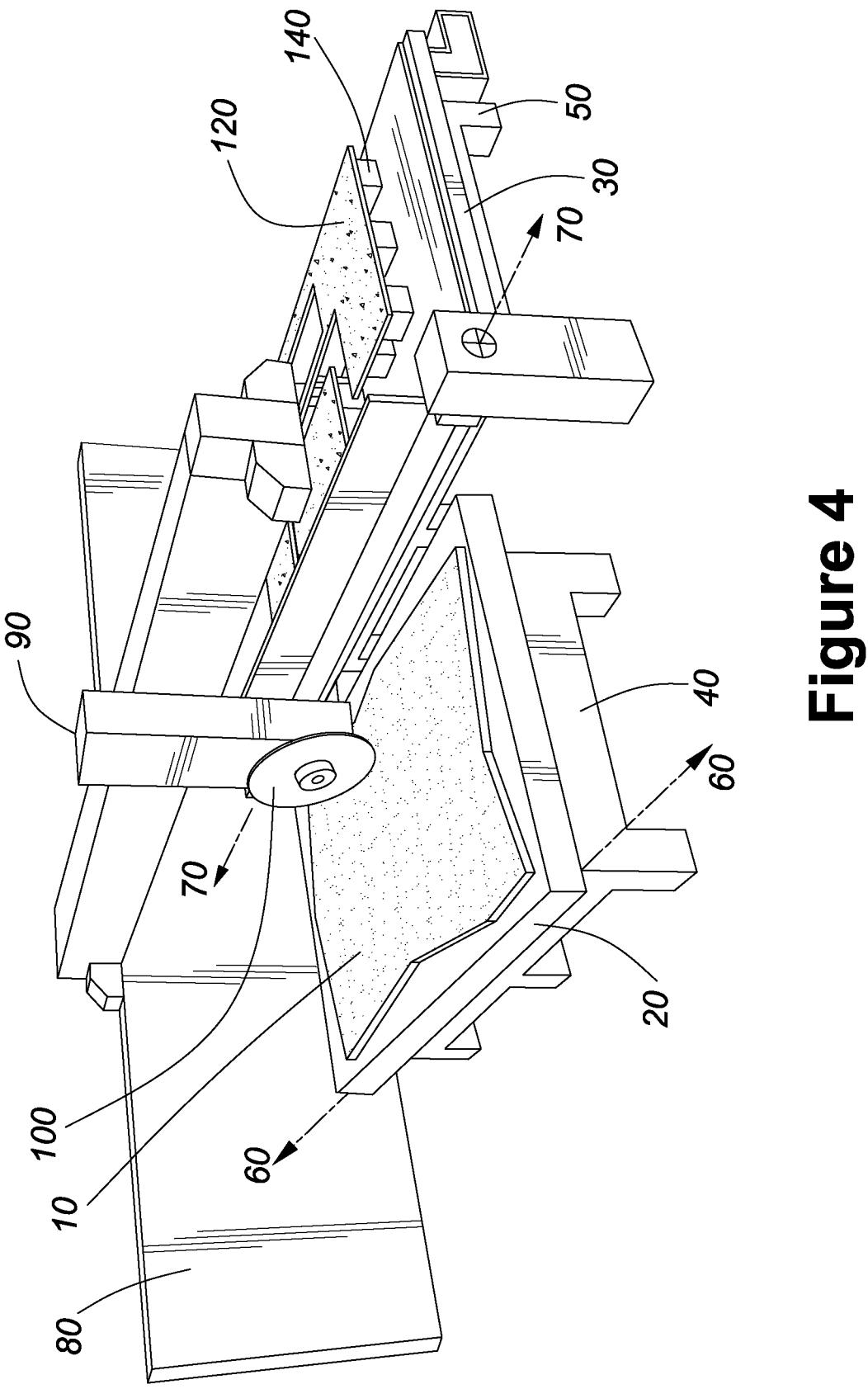
FIG. 4 is a perspective view showing a dual platform bed system with associated CNC machine with a saw cutting the stone slab on the first platform and the second platform standing idle.

In the invention, a programmable and moveable tool arm (90) is associated with both platforms (20, 30) and moveable over and between both platforms (20, 30) to position tools in a desired location and with a desired orientation (for example, contrast FIGS. 1 and 4 with respect to tool orientation).

Typical machinery (80) also easily integrates known means (not shown) to program and move the tool arm (90) over and between each platform (20, 30) associated with the tool arm (90).

Just by laying out the associated platforms (20, 30) (one next to the other with ranges of motion as indicated above) and machinery (80) as described above, the invention reduces physical real estate demand, human down time, and machine down time in the stone slab processing industry.

Because the platforms (20, 30) are in proximity to each other and moveable as they are in terms of motion range, this arrangement aspect of the present invention also improves over the prior art.

Moreover, this system arrangement lays the groundwork for optimized methods particularly with respect to processing stone slabs (10).

The following methods can apply to various material sheets, but particular benefits relating to stone slab (10) processing will become immediately apparent.

Although the advantageous methods are described in respect of processing multiple slabs (10) in sequence and one subsequent to another, the method can also be limited to single slabs (10) and single sheets (of various material) where desired.

The first step in one such advantageous method for cutting and preparing multiple stone slabs (10) is to provide the system of associated platforms (20, 30) and beds (40, 50) and machinery (80) as described above.

Thereafter, the following three phases are implemented.

A first phase (of steps) comprises pivoting the first platform (20) away from both the first platform frame bed (40) and second platform (30), to receive and mount the stone slab (10) onto the first platform (20).

The positioning of the first platform (20) is shown in FIGS. 1 and 2).

The stone slab (10) is mounted onto the first platform (20) with the unfinished stone slab side facing downward onto the first platform (20), and the finished side facing upward as in FIG. 2.

Figure 3:
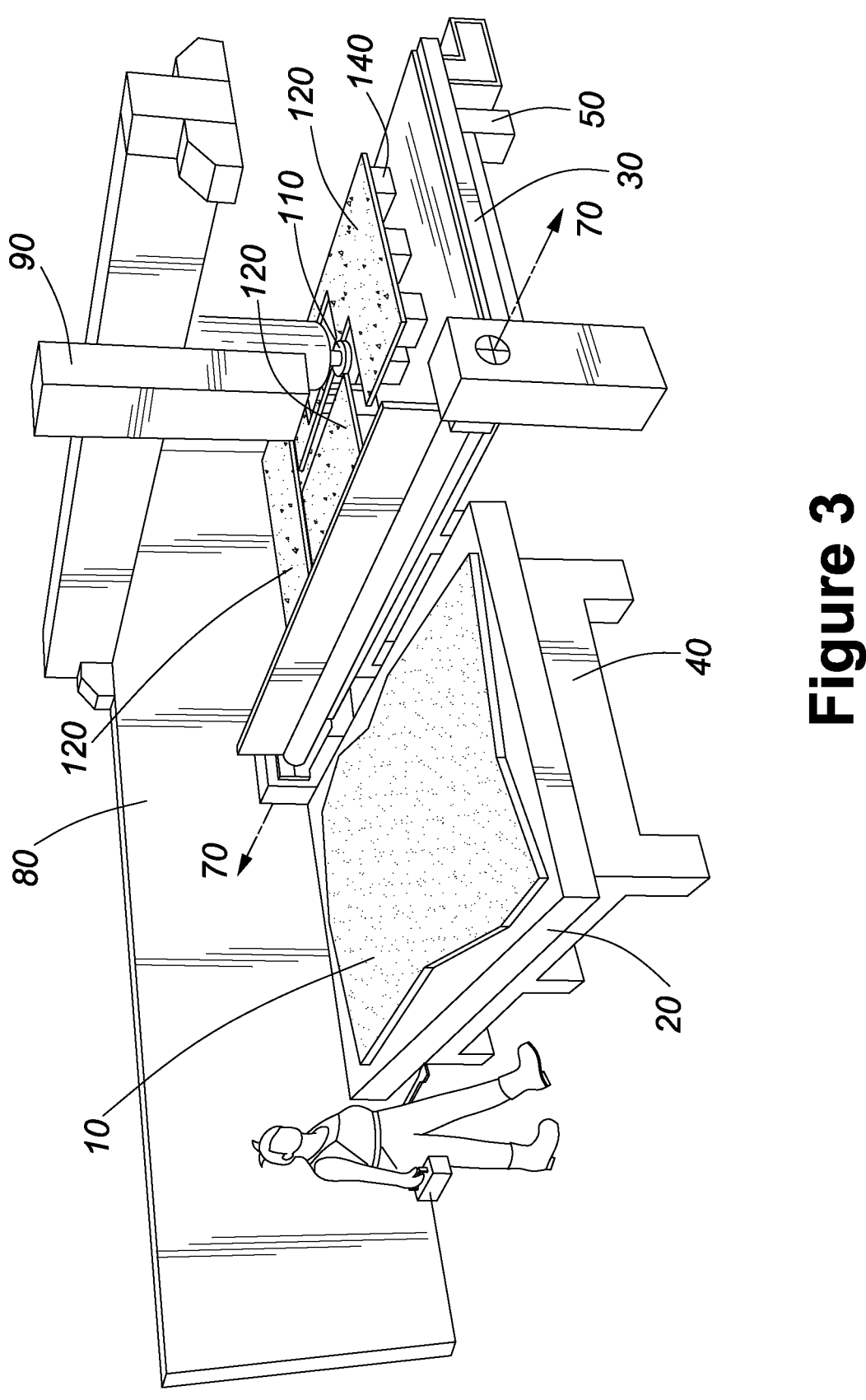
FIG. 3 is a perspective view showing a dual platform bed system with associated CNC machine with a stone slab loaded on the first platform and the second platform processing a stone slab perimeter.

The first platform (20) is then pivoted back to a position where the first platform (20) is contacting and covering the first platform frame bed (30) as in FIG. 3.

Figure 5:
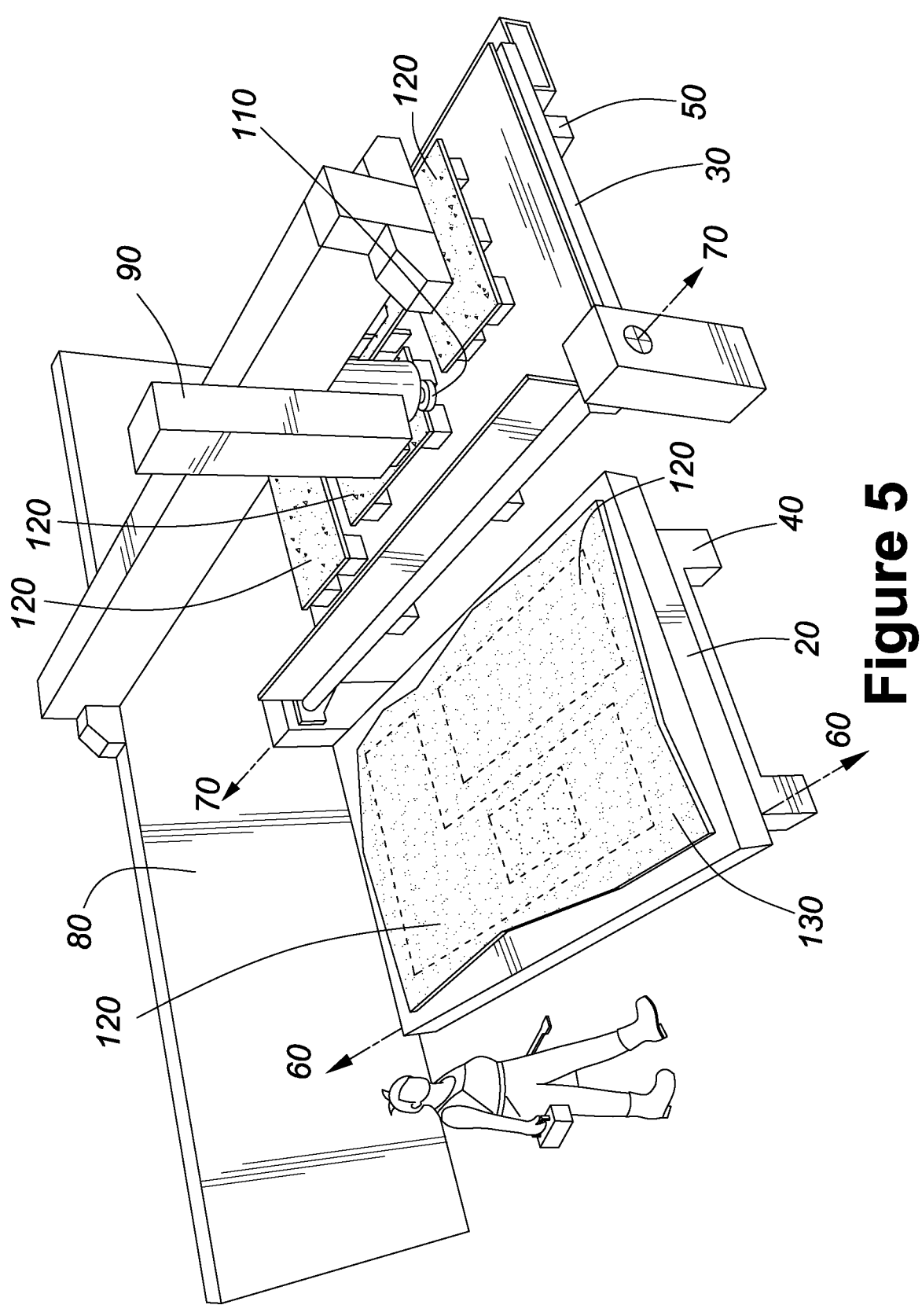
FIG. 5 is a perspective view showing a dual platform bed system with associated CNC machine with cut stone slab pieces on the first platform and the second platform processing a stone slab perimeter.

Best seen in FIG. 5, a worker using appropriate markers then defines and marks on the stone slab (10) selected cut shapes (120) for cutting and removal from excess remains (130).

By positioning the slab (10) with the finished side up, a saw (100) can cut through the stone slab (10) without concern for blow out on the slab (10) unfinished side.

The tool arm (90) is adapted with an appropriate cutting saw (100), be it a steel, diamond, water, or laser-based saw.

The tool arm (90) is then programmed to move over the first platform (20) and cut the selected stone shapes (120), and upon completion move away from both the first (20) and second (30) platform.

The computer program is then executed to move the tool arm (90) and saw (100) over the first platform (20) and cut (see FIG. 4) the selected stone shapes (120) to separate same from excess remains (130).

Upon cutting completion, the tool arm (90) is moved away (such as in FIG. 5) from the first platform (20), and this step completes the first phase.

A second phase of steps comprises providing a plurality of dual-end pneumatic vacuum clamps (140).

Figure 6:
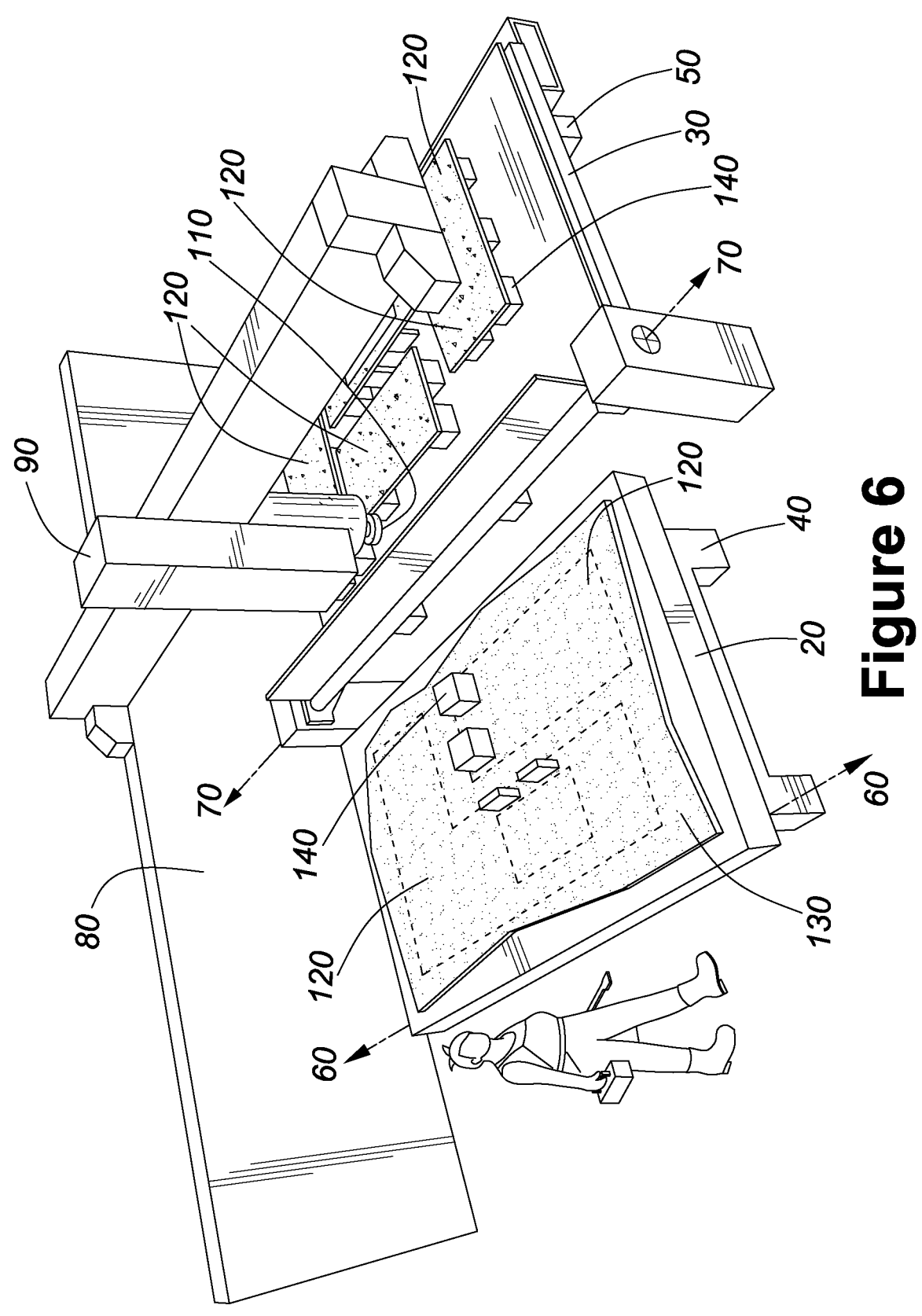
FIG. 6 is a perspective view showing a dual platform bed system with associated CNC machine with dual end pneumatic vacuum clamps placed on the cut stone slab pieces on the first platform and the second platform processing a stone slab perimeter.
Figure 7:
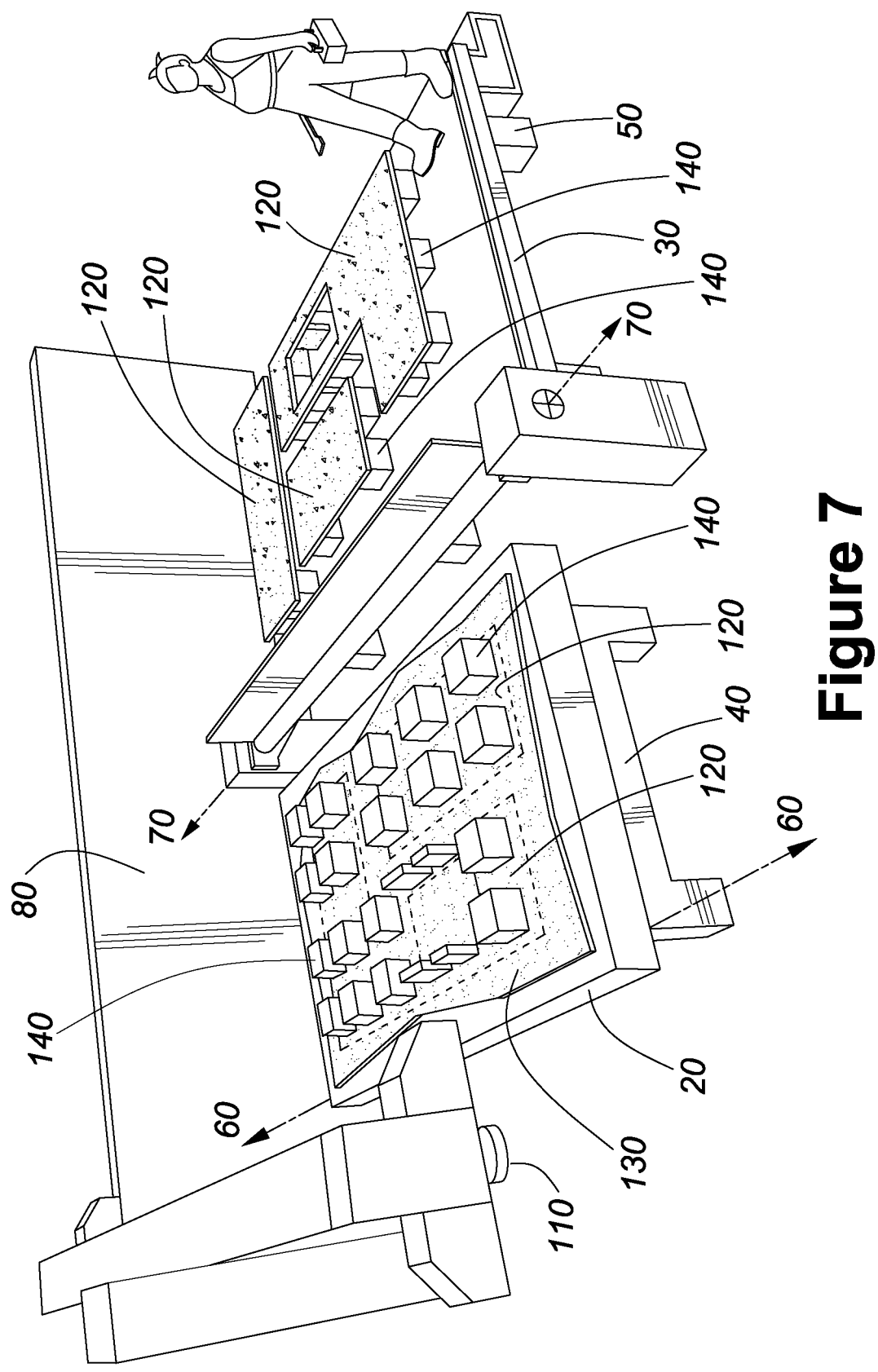
FIG. 7 is a perspective view showing a dual platform bed system with associated CNC machine with dual end pneumatic vacuum clamps on the cut stone slab pieces on the first platform and unloading cut stone slab pieces from the second platform.

The clamps (140) are placed onto the selected cut stone shapes (120) finished side (see FIGS. 6 and 7), and activated to form a vacuum between each clamp (140) and the corresponding selected shape (120).

8

This system and method yields a number of unexpected but measurable improvements when employed for a typical stone slab (10) preparation (into a counter top) including: a) reducing the human worker requirement from two to one; b) reducing the CNC machine (80) requirement from two to one; c) reducing the real estate requirement by almost two-thirds; and d) reducing the total (human plus machine) down time almost thirty-five percent.

TABLE 1

| Task or Phase\Time | 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| Unloading | | | W | W | W | | | | | | | W | W | W |
| Finishing | C | C | | | | C | C | C | C | C | C | W | W | T |
| Cutting | W | W | C | C | C | W | W | W | W | W | | C | C | T |
| Loading | W | W | | | | | | | | | W | T | T | T |

Thereafter the second platform (30) is moved to align over and cover the first platform (20) and contact the plurality of clamps (140), as shown in FIGS. 8 through 12.

The clamps (140) are then activated to correspondingly form vacuum seals between the clamps (140) and the second platform (30).

At this point the clamps (140) are vacuum sealed to both the cut pieces (120) and the second platform (30).

Figure 13:
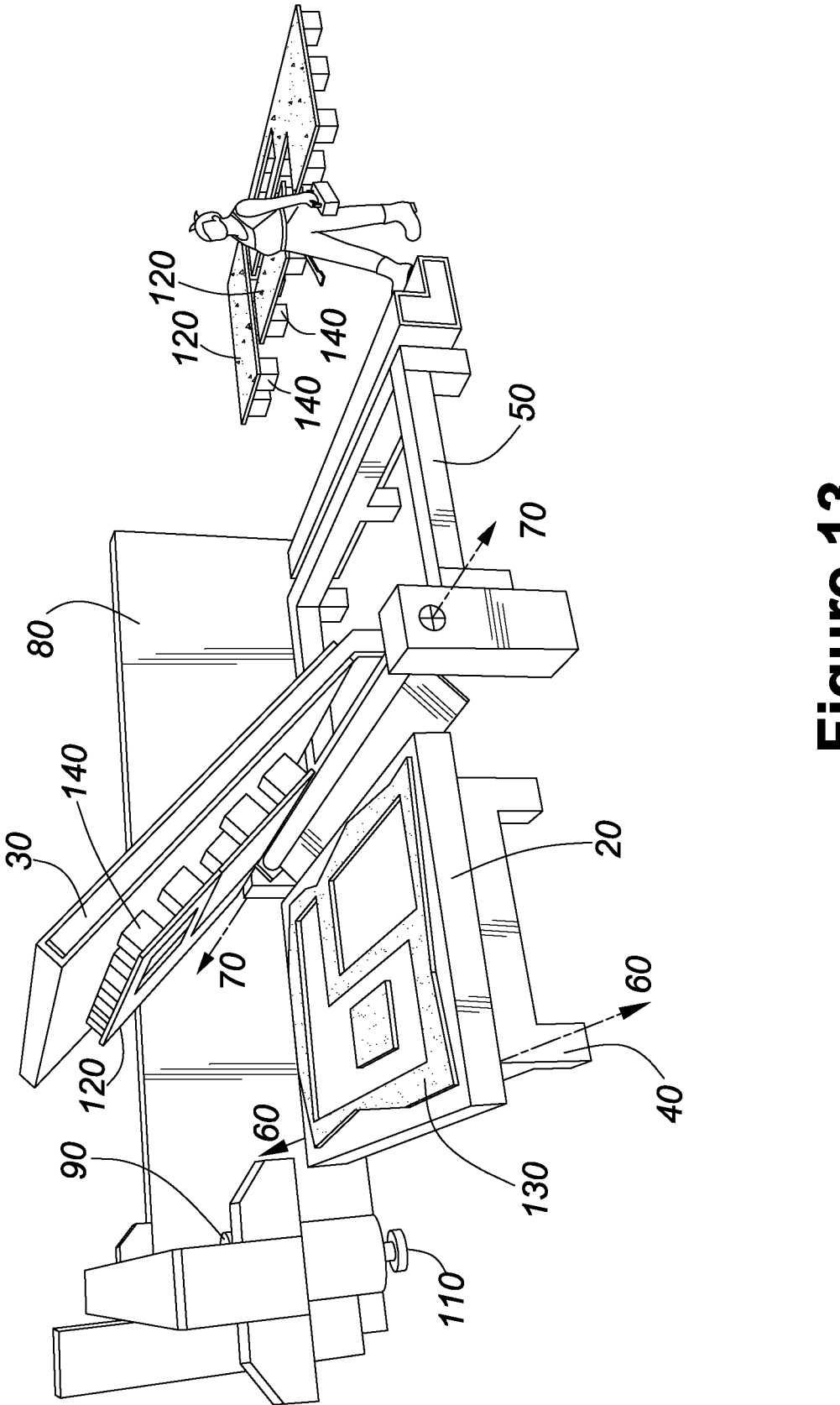
FIG. 13 is a perspective view showing a dual platform bed system with associated CNC machine with the second platform connected to dual end pneumatic vacuum clamps and cut stone slab pieces moving away from and leaving excess stone slab remains on the first platform.
Figure 14:
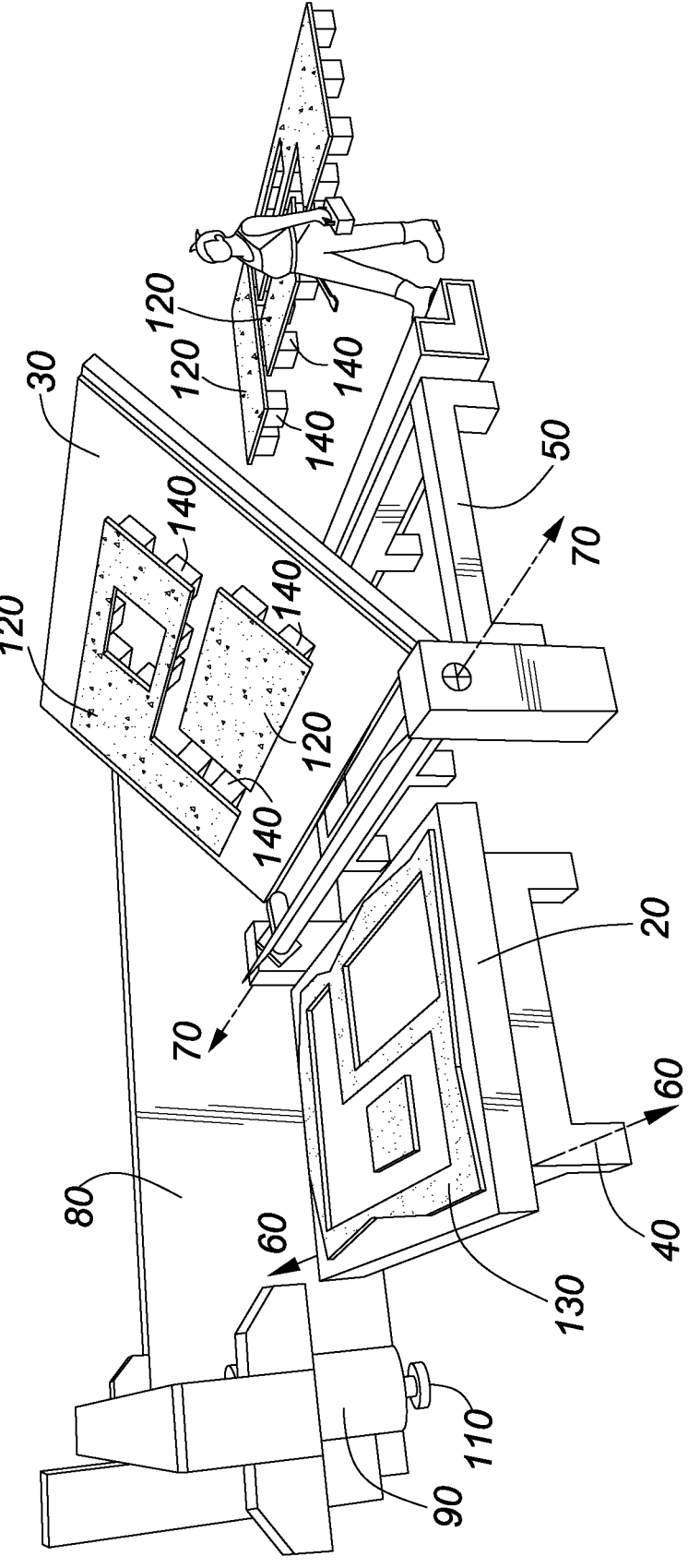
FIG. 14 is a perspective view showing a dual platform bed system with associated CNC machine with the second platform connected to dual end pneumatic vacuum clamps and cut stone slab pieces moving away from and leaving excess stone slab remains on the first platform.

As shown in FIGS. 13 through 15, the second platform (30) is thereafter moved back to contact and cover the second frame bed (50).

Because the selected cut stone shapes (120) are vacuum sealed to the clamps (140) that are in turn sealed to the second platform (30), the cut stone shapes (120) travel with the second platform (30).

The cut stone shapes (120) as shown in FIG. 15 are now facing finished side down and atop the clamps (140), and the cut stone shapes (120) have been separated from excess remains (130) on the first platform (20).

The second phase is completed upon return of the second platform (30) to the second frame bed (50) as in FIG. 15.

A third phase of steps comprises disconnecting the stone-cutting saw (100) from the tool arm (90) and connecting in place thereof, a router (110).

The router (110) is then aligned to the cut stone shapes (120) at a level measured from the stone finished side on the second platform (30).

The router (110) is used to create a desired perimeter profile of the cut stone shapes (120) by routering away undesired portions yet maintaining a flat and level finished surface.

The machinery (80) is programmed with relevant data to guide the router (110), and thereafter each cut stone shape (120) perimeter is routered.

Figure 16:
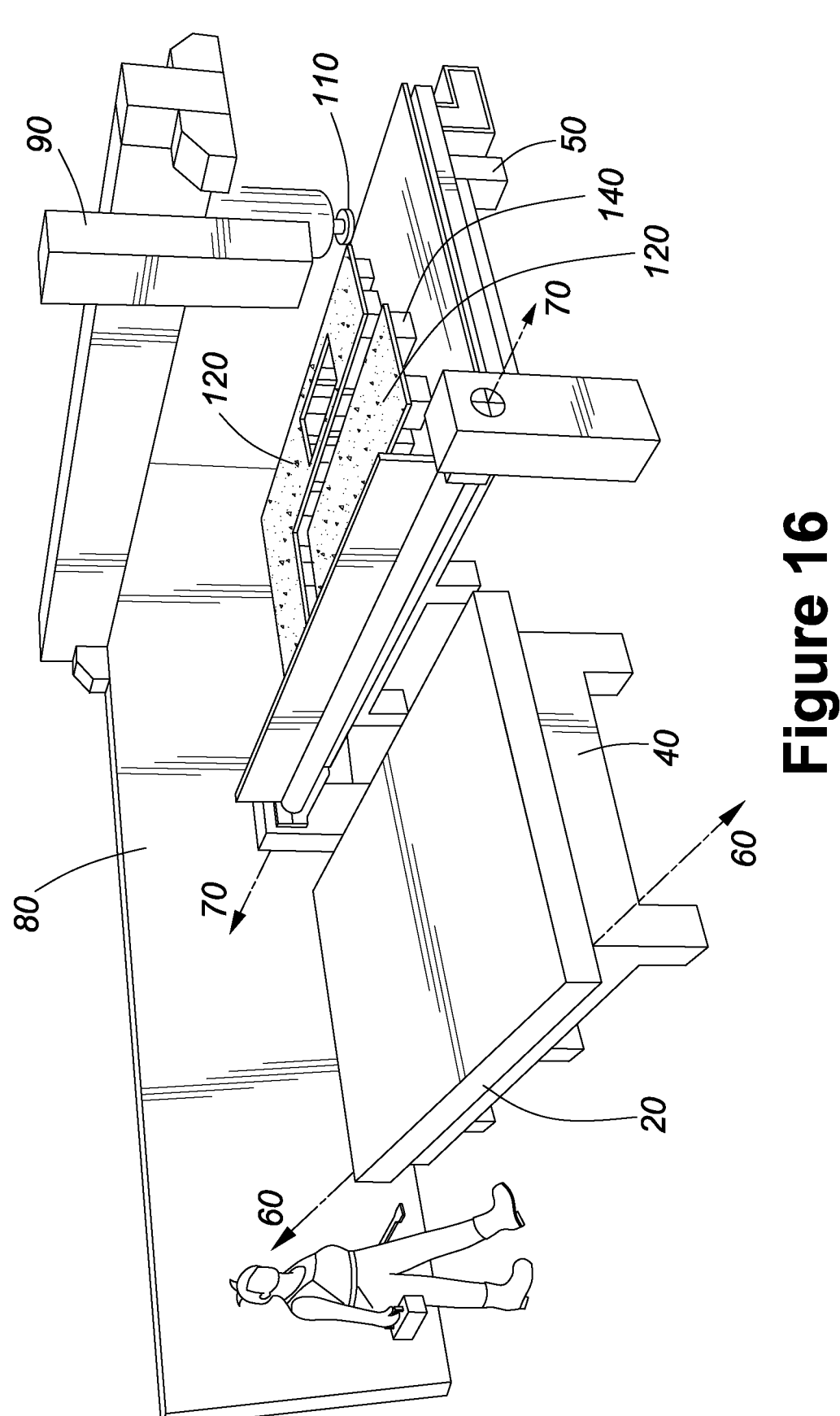
FIG. 16 is a perspective view showing a dual platform bed system with associated CNC machine with the first platform empty and the second platform processing a stone slab perimeter.

FIG. 16 shows routering occurring while excess remains (130) are being cleared from the first platform (20).

Upon excess remains (130) removal from the first platform (20), the third phase is complete.

Thereafter this method is continually restarted at the first phase described above, in respect of each subsequent slab (10) on completion of each third phase for each preceding slab (10).

While each second phase is started for each subsequent slab (10), the second platform (30) is correspondingly cleared of cut stone pieces (120) and clamps (140) once routering is complete.

Table 1 above elaborates on the operation cycle for multi-slab (10)/sheet preparation involving one human worker (W) and one machine system (C) described herein.

Reference letter T in Table 1 refers to platform (20, 30) movement, and the overall Table is presented as a matrix describing tasks in terms of five time intervals (for a total seventy minute cycle).

As such and for example, in a typical 70 minute cycle the human worker W can be tracked in the operation (including marking up and down time) as follows: from minutes 5 to 10, W is unloading and loading slabs (10).

From minutes 15 to 25, human worker W prepares pneumatic vacuum clamps, and from minutes 30 to 50 W places those clamps on cut pieces (120) on the first platform (20).

At minute 55, human worker W prepares a new slab (10) and from minutes 60 to 70, human worker W removes finished pieces (120) from the second platform (30).

Likewise, in a typical 70 minute cycle the platform (20, 30) and machine (80) system C can be tracked in the operation (including marking up and down time as follows: from minutes 5 to 10, system C works on routering pieces (120) on the second platform (30).

Between minutes 15 and 25, system C moves over to the first platform (20) and begins to cut a slab (10) into pieces (120).

Between minutes 30 and 55, system C moves back to the second platform (30) and continues routering cut pieces (120).

Between minutes 60 and 65, system C is parked as the second platform (30) is unloaded by human worker W.

Reference letter T in Table 1 shows times when either the first platform (20) or the second platform (30) are engaged in pivotal movement in transferring slabs (10) or cut pieces (120).

I claim:

1. A method for cutting and preparing a stone slab comprising the steps of:

I) providing a) a pair of associated platforms comprising a first platform and a second platform housed on corresponding frame beds comprising a first frame bed and a second frame bed, each platform and corresponding frame bed being stationed beside and in proximity to the other platform and corresponding frame bed;

i) each platform being pivotable and moveable about a respective longitudinal axis along the corresponding associated frame bed;

ii) the second platform and second frame bed stationed next to the first platform and first frame bed wherein the second platform is pivotable and moveable ranging in motion from contacting and covering the second frame bed to aligning over and covering the first platform and back to contacting and covering the second frame bed;

iii) the first platform and first frame bed stationed next to the second platform and second frame bed wherein the first platform is pivotable and moveable ranging in motion from contacting and covering the first frame bed to away from both the first platform frame bed and away from the second platform and then back to contacting and covering the first frame bed;

iv) a hydraulic or pneumatic industrial machine associated with each platform to pivotably move said platforms through each corresponding range of motion; and b) a programmable and moveable tool arm associated with both platforms and moveable over and between both platforms to position tools in a desired location and with a desired orientation;

i) holding a stone-cutting saw with the tool arm; whereupon the following steps are undertaken:

II) a first phase comprising the following steps:

a) the first platform is pivoted away from both the first platform frame bed and second platform to receive and mount the stone slab onto the first platform with a finished side of the slab side up and contacting the first platform with an unfinished side facing down on the first platform;

b) mounting the stone slab onto the first platform finished side up;

c) pivoting the first platform back to contacting and covering the first platform frame bed;

d) defining on the slab selected shapes to be cut and removed from excess remains;

e) programming the tool arm to move over the first platform and cut the selected stone shapes, and upon completion move away from both the first and second platform;

f) moving the tool arm and stone-cutting saw over the first platform and cutting the selected stone shapes with the stone-cutting saw to separate the selected cut shapes from excess remains;

g) upon cutting completion moving the tool arm away from both the first and second platform; and III) a second phase comprising the following steps:

a) providing a plurality of dual-end pneumatic vacuum clamps;

b) placing onto the selected cut stone shapes finished side the plurality of dual-end pneumatic vacuum clamps for selectively vacuum sealing to at least one of the cut stone shapes finished side and the second platform upon vacuum activation at least one clamp end of the dual-end pneumatic vacuum clamps;

c) activating vacuum seals between the plurality of clamps and the cut stone shapes on the stone finished side to form a vacuum between each clamp and each corresponding cut stone shape;

d) moving the second platform to align over and cover the first platform and contact the plurality of clamps;

e) activating vacuum seals between the clamps and the second platform to form a vacuum between clamp and the second platform; and f) thereafter moving the second platform back to contact and cover the second frame bed, with the selected cut stone shapes facing finished side down and atop suction cups, to separate the selected cut stone shapes from excess remains on the first platform.

2. The method for cutting and preparing, as in claim 1, the method further comprising the step of:

IV) a third phase comprising the following steps:

a) disconnecting the stone-cutting saw the tool arm;

b) connecting a router to the tool arm;

c) aligning the router to the cut stone shapes at a level measured from the stone finished side on the second platform; and d) routering the selected cut stone shapes along a perimeter defined by each cut stone shape.

3. The method for cutting and preparing, as in claim 2, wherein the third phase further comprises the steps of:

e) while routering the cut stone shapes, clearing excess remains from the first platform; and f) after clearing the excess remains from the first platform, restarting the first phase for at least one subsequent slab on completion of the third phase for a preceding slab.

4. The method for cutting and preparing, as in claim 1, wherein:

stone first side is the finished side.

5. The method for cutting and preparing, as in claim 1, wherein a stone second side is the unfinished side.

6. A method for stone slab production comprising the steps of:

I) placing adjacent to one another:

a) a pair of associated platforms comprising a first platform and a second platform each housed on corresponding frame beds comprising a first frame bed and a second frame bed, each platform and corresponding frame bed being stationed beside and in proximity to the other platform and corresponding frame bed;

i) each platform being pivotable and moveable about a respective longitudinal axis along the corresponding associated frame bed;

ii) the second platform and second frame bed stationed next to the first platform and first frame bed wherein the second platform is pivotable and moveable ranging in motion from contacting and covering the second frame bed to aligning over and covering the first platform and back to contacting and covering the second frame bed;

iii) the first platform and first frame bed stationed next to the second platform and second frame bed wherein the first platform is pivotable and moveable ranging in motion from contacting and covering the first frame bed to away from both the first platform frame bed and away from the second platform and then back to contacting and covering the first frame bed;

iv) a hydraulic or pneumatic industrial machine associated with each platform to pivotably move said platforms through each corresponding range of motion;

v) a tool arm associated with both platforms and programmed to move over and between both platforms to position tools in a desired location and with a desired orientation;

vi) holding a pre-selected operable tool with the tool arm; and

II) loading a stone slab on the first platform;

III) processing the slab on the first platform using the tool arm and pre-selected operable tool;

IV) after processing the slab transporting at least a portion of the slab to the second platform by using dual ended pneumatic vacuum clamps connected to both the portion of slab to be transported and the second platform when the second platform is aligned over and covering the first platform and by subsequently moving the second platform back over to the second frame bed;

V) further processing the slab portion on the second platform using the tool arm and another pre-selected operable tool; and VI) removing from the first platform any excess slab in preparation to receive a subsequent slab for processing.

\* \* \* \* \*